United States Patent
Cain

(10) Patent No.: US 11,017,747 B2
(45) Date of Patent: May 25, 2021

(54) SYSTEMS AND METHODS FOR ADAPTIVE CALIBRATION FOR DYNAMIC ROTATION OF COMPUTING DEVICE

(71) Applicant: Microsoft Technology Licensing, LLC, Redmond, WA (US)

(72) Inventor: Jonathan M. Cain, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/542,809

(22) Filed: Aug. 16, 2019

(65) Prior Publication Data
US 2021/0049984 A1 Feb. 18, 2021

(51) Int. Cl.
G09G 5/00 (2006.01)
G09G 5/38 (2006.01)
H04M 1/02 (2006.01)
G06T 3/60 (2006.01)

(52) U.S. Cl.
CPC ............... G09G 5/38 (2013.01); G06T 3/60 (2013.01); H04M 1/0202 (2013.01); G09G 2340/0492 (2013.01); H04M 2250/12 (2013.01)

(58) Field of Classification Search
CPC .... G09G 2340/0492; G06F 2200/1614; G06F 1/1626; G06F 1/1684; G06F 1/1601
USPC .......................................................... 345/659
See application file for complete search history.

(56) References Cited

U.S. PATENT DOCUMENTS

| | | | |
|---|---|---|---|
| 5,592,599 A * | 1/1997 | Lindholm | ............ G06T 3/005 345/427 |
| 8,351,773 B2 | 1/2013 | Nasiri et al. | |
| 8,459,094 B2 | 6/2013 | Yanni | |
| 8,676,528 B2 | 3/2014 | Almalki et al. | |
| 9,244,499 B2 | 1/2016 | Tu | |
| 9,279,680 B2 | 3/2016 | Buchanan et al. | |
| 10,054,442 B2 | 8/2018 | Georgy et al. | |

(Continued)

FOREIGN PATENT DOCUMENTS

WO 2008068542 A1 6/2008

OTHER PUBLICATIONS

Pedley, Mark, "Tilt Sensing Using a Three-Axis Accelerometer", in Freescale Semiconductor Application Note, Document No. AN3461, Rev. 6", Mar. 2013, 22 Pages.

*Primary Examiner* — Gordon G Liu
(74) *Attorney, Agent, or Firm* — Arent Fox, LLP

(57) ABSTRACT

Aspects of the present disclosure include a computing device for adaptive calibration for dynamic rotation. In an example, a computing device may include an orientation sensor to generate orientation information corresponding to an orientation of the computing device. The computing device monitor a rotation of the computing device based on the orientation information and determine a resting rotational angle of the computing device does not match a desired endpoint orientation angle. The computing device may set the endpoint orientation angle equal to the resting rotational angle and map a set of image orientation angles of an image according to the endpoint orientation angle and a second endpoint orientation angle. The computing device may determine the computing device is rotating based on the orientation information and cause dynamic display of the image based on the set of image orientation angles in response to a rotation of the computing device.

20 Claims, 8 Drawing Sheets

(56) References Cited

U.S. PATENT DOCUMENTS

2013/0328935 A1* 12/2013 Tu .................... G06F 1/1694
   345/651
2015/0354951 A1   12/2015 Ali et al.
2016/0071241 A1*  3/2016 Karunamuni ....... G06F 3/04845
   345/156

* cited by examiner

SYSTEMS AND METHODS FOR ADAPTIVE CALIBRATION FOR DYNAMIC ROTATION OF COMPUTING DEVICE

BACKGROUND

The present disclosure relates to computing devices, and more particularly, to systems and methods for adaptive calibration for dynamic rotation of computing devices.

A computing device may allow an image (e.g., user interface (UI), icon, taskbar) to change display modes (e.g., between portrait and landscape modes) in response to a specific change in orientation of the computing device. The change of the display modes of the image typically occurs at a specific orientation angle (e.g., 0, 90, 180 degrees) of the computing device. For example, if a user streams a movie on a computing device, such as a smart phone, the user may rotate the computing device from a landscape orientation (e.g., 0 degrees) to a portrait orientation (e.g., 90 degrees), or vice versa, and the mode of the image (in this example the user interface of the movie) may change from the portrait mode to the landscape mode when the computing device reaches the landscape orientation.

Some computing devices perform dynamic rotation (or real-time rotation) of an image which maintains the image in the same orientation with respect to the user while the computing device changes orientation. In an example, dynamic rotation may allow the user to continue to view the movie at the same orientation while the computing device rotates from the portrait orientation to the landscape orientation. In some situations, when an image is dynamically rotated, the orientation of the image may not match the orientation of the computing device, which may cause the image to appear skewed relative to the computing device.

Accordingly, there is a need in the art for improvements to the dynamic rotation of a computing device.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In an example, a computing device is provided. The computing device may include an orientation sensor to generate orientation information corresponding to an orientation of the computing device. The computing device may also include a memory storing instructions and a set of orientation angles of the computing device including an endpoint orientation angle and a second endpoint orientation angle. The computing device may also include a processor communicatively coupled with the orientation sensor and the memory. The processor may be configured to execute the instructions to determine a resting rotational angle of the computing device does not match the endpoint orientation angle based on the orientation information. The processor may also be configured to execute the instructions to set the endpoint orientation angle equal to the resting rotational angle. The processor may also be configured to execute the instructions to map a set of image orientation angles of an image according to the endpoint orientation angle and the second endpoint orientation angle. The processor may also be configured to execute the instructions to determine the computing device is rotating based on the orientation information. The processor may also be configured to execute the instructions to cause dynamic display of the image based on the set of image orientation angles in response to a rotation of the computing device.

In another example, a method is provided. The method may include generating orientation information corresponding to an orientation of a computing device. The method may also include determining a resting rotational angle of the computing device does not match an endpoint orientation angle of a set of orientation angles of the computing device based on the orientation information. The method may also include setting the endpoint orientation angle equal to the resting rotational angle. The method may also include mapping a set of image orientation angles of an image according to the endpoint orientation angle and a second endpoint orientation angle of the set of orientation angles. The method may also include determining the computing device is rotating based on the orientation information. The method may also include causing dynamic display of the image based on the set of image orientation angles in response to a rotation of the computing device.

In another example, a computer-readable medium storing instructions executable by a processor is provided. The computer-readable medium may include instructions to generate orientation information corresponding to an orientation of a computing device. The computer-readable medium may also include instructions to determine a resting rotational angle of the computing device does not match an endpoint orientation angle of a set of orientation angles of the computing device based on the orientation information. The computer-readable medium may also include instructions to set the endpoint orientation angle equal to the resting rotational angle. The computer-readable medium may also include instructions to map a set of image orientation angles of an image according to the endpoint orientation angle and a second endpoint orientation angle of the set of orientation angles. The computer-readable medium may also include instructions to determine the computing device is rotating based on the orientation information. The computer-readable medium may also include instructions to cause dynamic display of the image based on the set of image orientation angles in response to a rotation of the computing device.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

Figure 1:
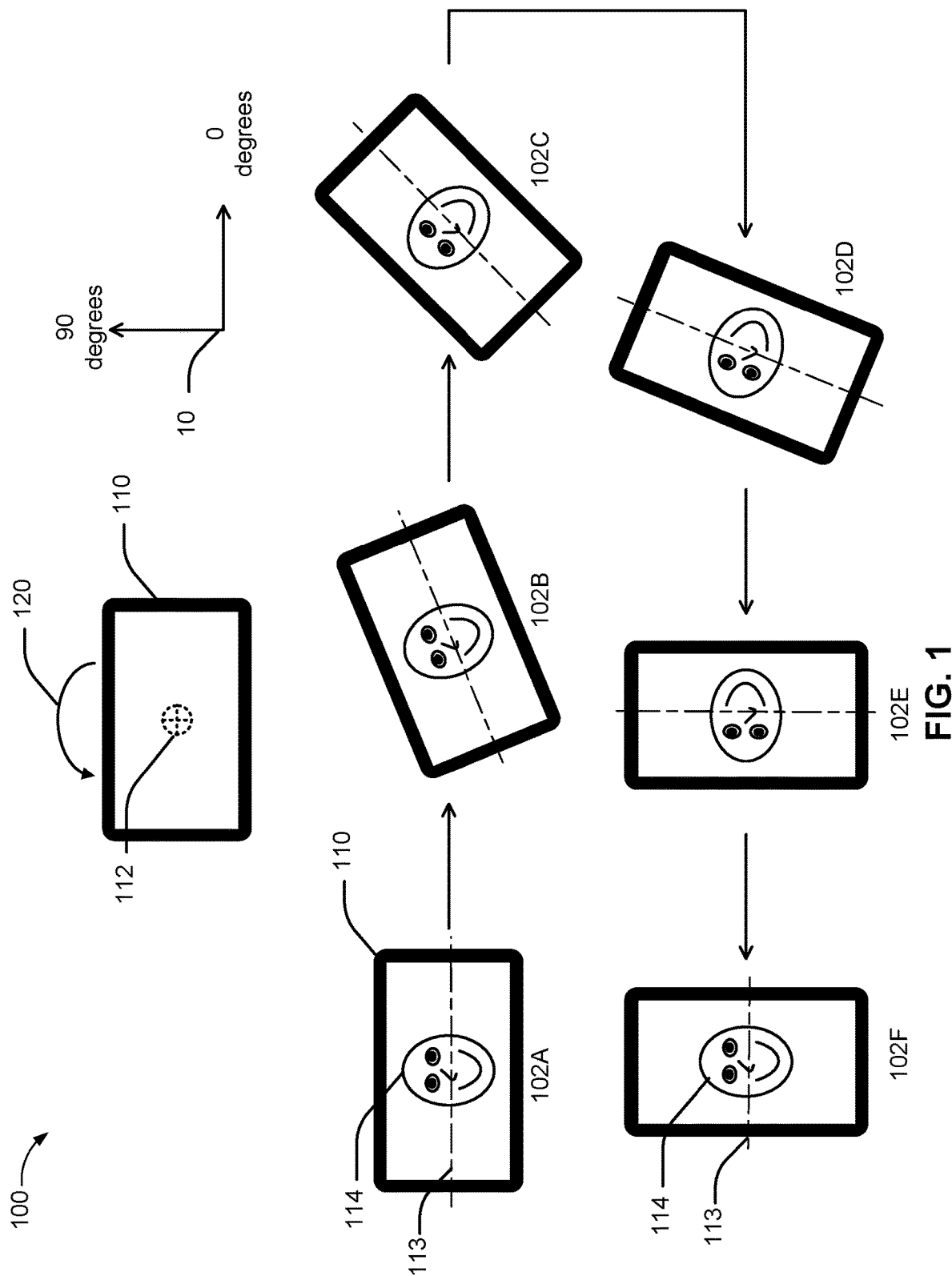
FIG. 1 is a conceptual diagram of an example of a rotation process performed by a computing device.

The present disclosure provides devices and methods for adaptive calibration for dynamic rotation of computing device. In an example, the systems and methods disclosed herein may allow a computing device to perform an "auto-leveling" recalibration of one or more images being displayed by the computing device based on a resting angle of the computer device not exactly matching an angle of a display orientation for presenting the one or more images. The computing device may perform the auto-leveling recalibration for dynamic rotation ("real-time" rotation) of an image in response to a rotation of the computing device so that subsequent computer device rotation is based on the recalibration.

For example, in one implementation, an auto-leveling recalibration system for a computing device rotates a user interface (UI) or shell displayed by the computer device in response to the orientation of the device. Specifically, for a computing device that does "real-time" rotation, when a final rotation as reported by an orientation sensor does not exactly match a "cardinal" direction (landscape or portrait), after a short time period, the computer device may recalibrate a resting angle of the final rotation to be exactly a cardinal angle, display the image according to the respective cardinal direction, and linearly interpolate subsequent sensor samples between the new angle endpoints. For instance, if the orientation sensor reads 88 degrees as one endpoint, and −2 degrees as the other, the computer device performing the auto-leveling described herein will recalibrate to map those values to 0-90 and recalibrate all intermediate values so that a subsequent rotation of the computer device causes a corresponding rotation in the image based on the recalibrated values.

In another example, the computing device may include an orientation sensor (e.g., gravity sensor) which provides orientation information corresponding to an orientation of the computing device. In an example, the computing device may rotate from a first orientation (e.g., landscape orientation) towards a second orientation (e.g., portrait orientation). However, the computing device may stop rotation such that a resting angle of rotation of the computing device does not equal an angle of the second orientation (e.g., computing device over-rotated or under-rotated), as reported by the orientation sensor. According to the present disclosure, in response to the computing device remaining at the resting angle for a time period, the computing device may recalibrate or map the resting angle of the computing device to a final orientation angle of the image (in this example, the angle for the second orientation), so the image does not appear skewed as compared to the position of the computing device. Further, the computing device may linearly interpolate subsequent sensor samples based on this recalibration. For example, the computing device may have a landscape orientation that typically corresponds to an orientation sensor value of 0 degrees, and a portrait orientation that corresponds to an orientation sensor value of 90 degrees. In this example, when the computer device is rotated to a position where the orientation sensor reads −2 degrees as a resting angle, then the computing device will recalibrate its outputted orientation system for controlling presentation of the image and subsequent rotation of the image based on rotation of the computer device (e.g., until a new resting position is determined). In this case, the computer device recalibrates the orientation of −2 degrees by mapping it to 0 degrees, thereby causing the image to be displayed in the landscape orientation even though the computer device is not exactly oriented at 0 degrees. Further, the computer device will recalibrate how it reacts to subsequent computer device rotation by mapping the 92 degree rotation between −2 degrees and 90 degrees to be a rotation between 0 and 90 degrees. In other words, the real time display of the relative change in the orientation of the display of the image between 0 and 90 degrees is recalibrated based on the resting angle of −2 degrees to be a rotation between −2 and 90 degrees, which is has a 1.02 ratio. If the subsequent resting angle turned out to be 91 degrees, for instance, then the computer device would recalibrate this value to be 90 degrees to control a current presentation of the image, and would recalibrate orientations between 91 degrees and 0 degrees to be between presentation orientations between 90 and 0 degrees. Thus, the present disclosure provides a simple and efficient solution for an auto-leveling recalibration system for a computing device that rotates a UI or shell in real time in response to the orientation of the device, and when a final rotation as reported by an orientation sensor does not exactly match a "cardinal" direction (landscape or portrait), Turning now to the figures, examples of systems and methods for adaptive calibration for dynamic rotation of an image on a computing device are depicted. It is to be understood that aspects of the figures may not be drawn to scale and are instead drawn for illustrative purposes.

Referring to FIG. 1, a typical rotation process 100 performed by a computing device 110 is depicted. As shown, the computing device 110 may include a rotation point 112 which is used for rotating the computing device 110 from a landscape orientation (e.g., 0 degrees) to a portrait orientation (e.g., 90 degrees) or vice versa, as illustrated by orientations 102A-102F. Rotation of the computing device 110 may be in relation to the axes 10, as shown by FIG. 1.

In an example, the computing device 110 may rotate in a counter-clockwise direction 120 while maintaining an image 114 in a same orientation relative to the computer device 110 until a final computer device orientation is reached. In particular, as the computing device 110 is rotated between orientations 102A and 102E, an orientation 113 of the image 114 may remain in the original orientation relative to the computing device 110 throughout the rotation of the computing device 110 from orientation 102A to orientation 102E. When the computing device 110 reaches (or nearly reaches) the portrait orientation, at orientation 102E, the computing device 110 may recognize that the computing device 110 is in (or nearly oriented in) the portrait orientation and may re-orient the image 114 to a portrait orientation, at computer device orientation 102F.

Figure 2:
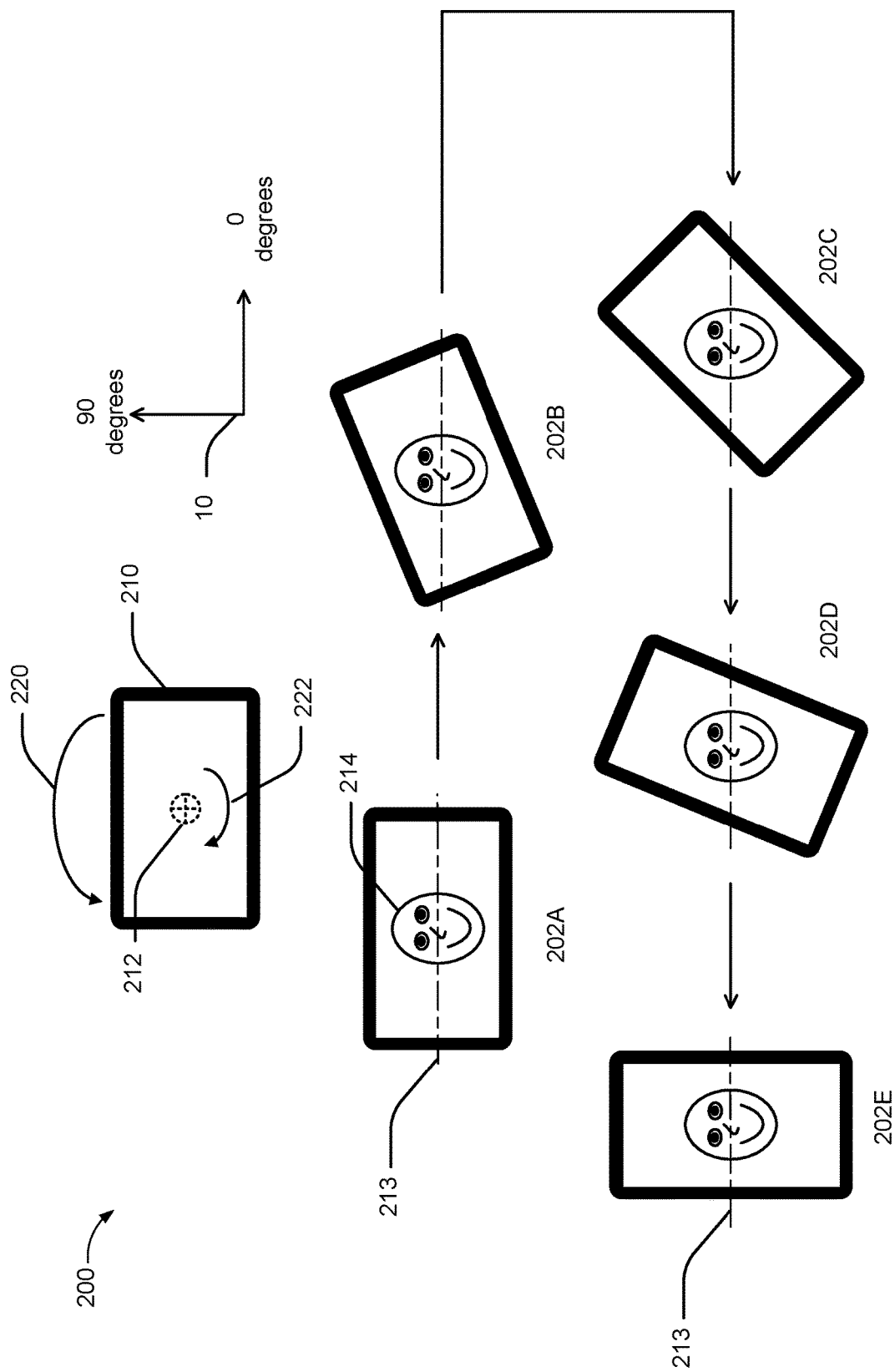
FIGS. 2 and 3 are conceptual diagram of examples of a dynamic rotation process performed by a computing device, according to aspects of the present disclosure.
Figure 3:
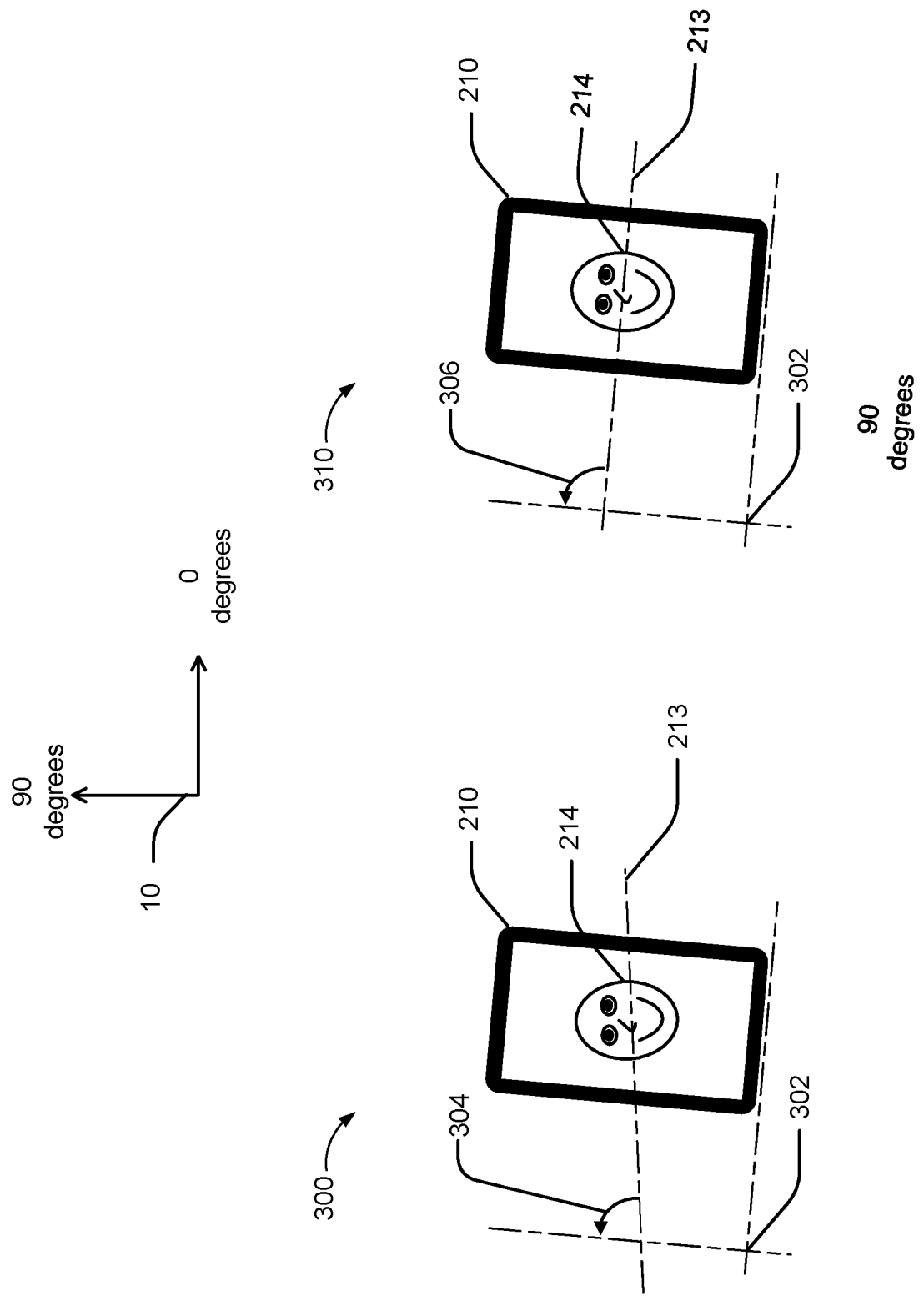

Referring to FIGS. 2 and 3, in contrast, an example of a dynamic rotation process 200 performed by a computing device 210 is configured to dynamically rotate an image 214 while the computing device 210 is physically rotated. This may be referred to as a "real-time" image rotation. For example, the computing device 210 may rotate about a rotation point 212 to rotate the computing device 210 from a landscape orientation (e.g., 0 degrees) to a portrait orientation (e.g., 90 degrees), or vice versa. When the dynamic rotation process is performed, the image 214 may maintain a same orientation 213 relative to a user, while the computing device 210 is physically rotated, as illustrated by orientations 202A-202E. In an aspect, the appearance of the image 214 maintaining the same relative orientation to the user is accomplished by the computing device 210 rotating a presentation of the image 214 about the rotation point 212 in a clockwise direction 222 by a relative amount (or step amount) corresponding to an amount of rotation of the computing device 210 in a counter-clockwise direction 220.

Sometimes, when rotating from one orientation to another orientation (e.g., portrait to landscape, or vice versa), the computing device 210 may come to rest at an angle that is different from an exact rotational angle corresponding to the desired display orientation, as shown by orientations 300 and 310 of FIG. 3. For explanation, axes 302 may represent lines parallel to the sides of the computing device 210, for explanation of the orientations 300 and 302. In an example, the computing device 210 may come to rest at a rotational angle close to (but not equal to) an angle corresponding to the landscape orientation (e.g., 0 degrees) or the portrait orientation (e.g. 90 degrees). In orientation 300, the computing device 210 may be at a resting orientation angle that does not match the landscape or portrait orientations, as shown by the axes 302 being skewed to the axes 10. In this case, the image 214 may remain in an image orientation angle corresponding to a most recent step amount and thereby appear skewed to the user. For example, as shown by orientation 300, the orientation 213 of the image 214 may be at an angle 304 that is skewed (e.g., less than 90 degrees) to the sides of the computing device 210 thereby causing the image 214 to appear skewed to the computing device 210 while in the resting position According to aspects of the present disclosure, an adaptive calibration or auto-leveling process may be performed to prevent the image 214 from appearing skewed to the orientation of the computing device 210. In orientation 310, the computing device 210 may be at a resting orientation angle that does not match the landscape or portrait orientations, as shown by the axes 302 being skewed to the axes 10. In contrast to the orientation 300, in orientation 310 the computing device 210 may perform the adaptive calibration such that the orientation 213 of the image 214 may be oriented at an angle 306 that is not skewed (e.g., equal to 90 degrees) thereby causing the image 214 to appear parallel to the computing device 210 while in the resting position.

Figure 4:
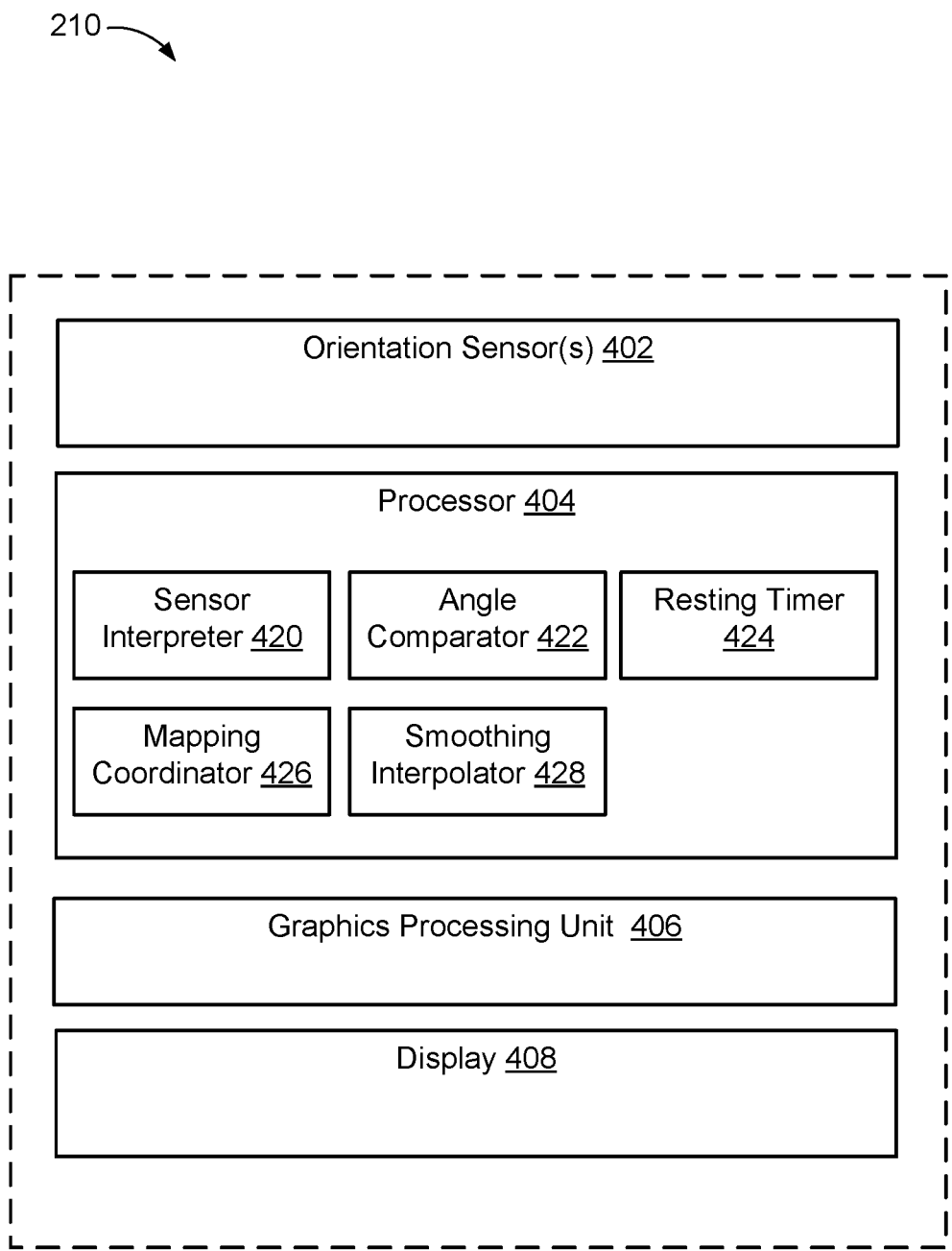
FIG. 4 is a block diagram of examples of components of a computing device for adaptive calibration for dynamic rotation, according to aspects of the present disclosure.
Figure 5:
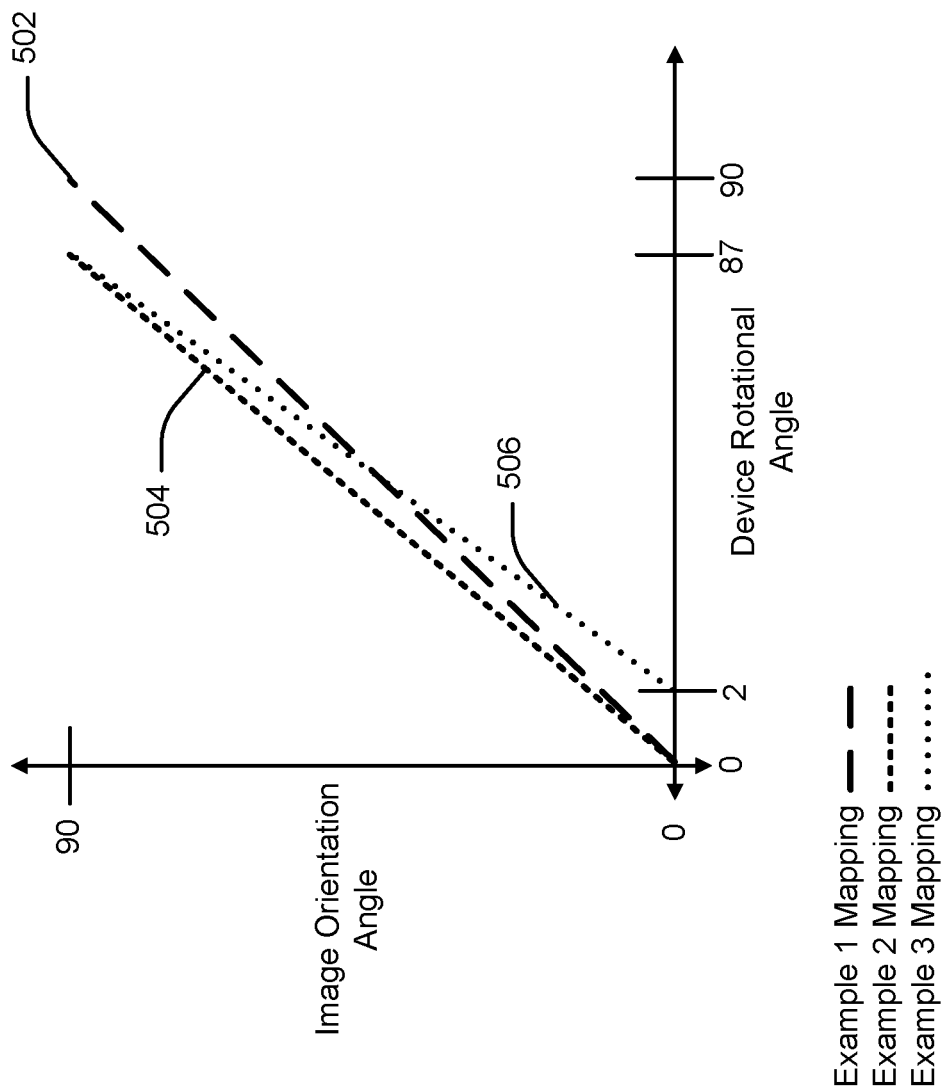
FIGS. 5 and 6 are graphs of image orientation angle versus device rotation angle for an example of a mapping process performed by the computing device of FIG. 4, according to aspects of the present disclosure.
Figure 6:
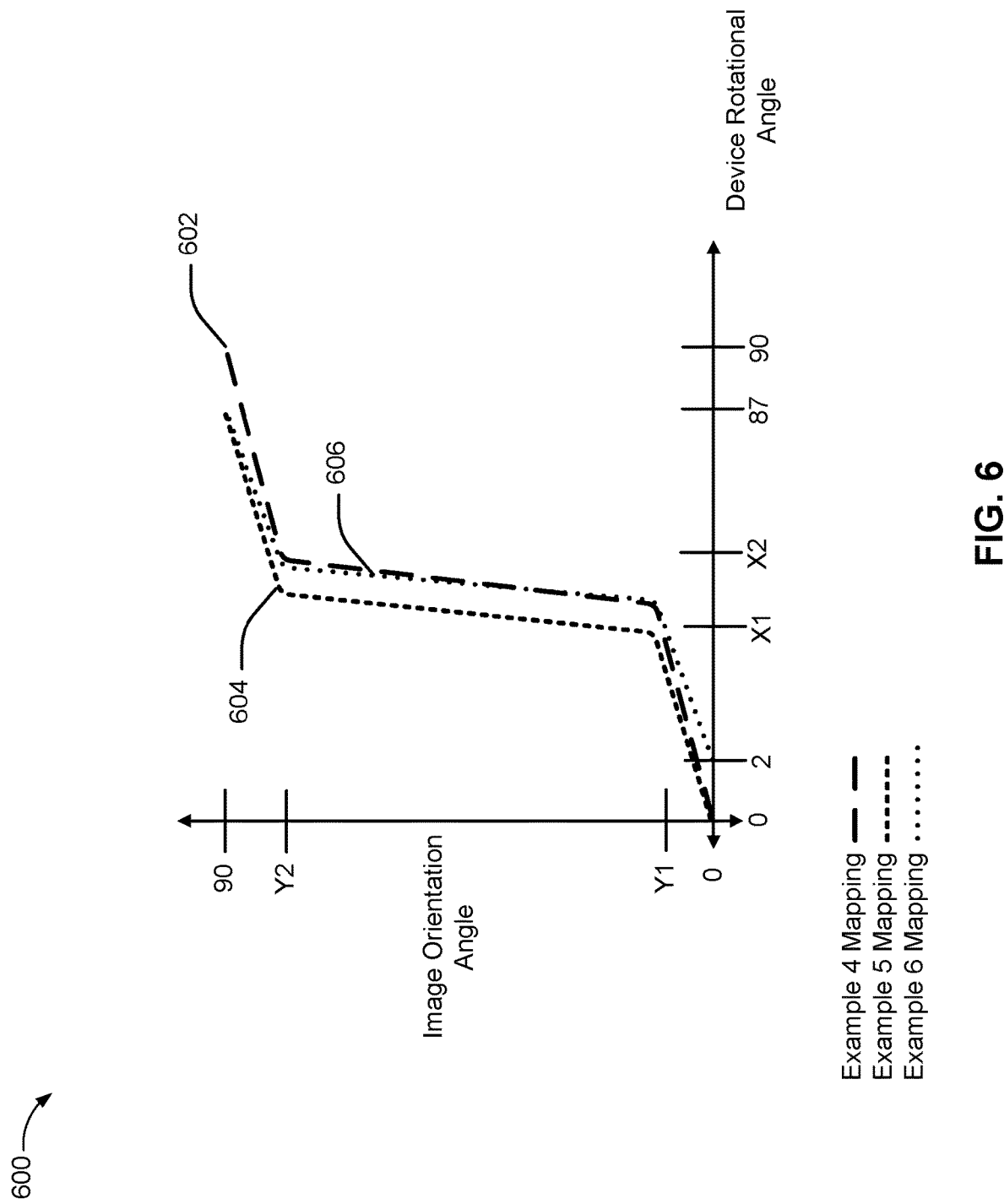

Referring to FIGS. 4-6, components of the computing device 210 and additional examples of the adaptive calibration for dynamic rotation are depicted. The computing device 210 may include one or more orientation sensors 402 configured to generate orientation information corresponding to a physical orientation of the computing device 210. In an example, when the computing device 210 is being rotated, the orientation sensors 402 may provide one or more vector coordinates or positions (e.g., x, y, z coordinates) corresponding to the orientation of the computing device 210. Examples of the orientation sensors 402 may include one or more gravity sensors, accelerometers, gyroscope, and/or any sensor configured to provide a rotational orientation of the computing device 210.

In an aspect, the computing device 210 may also include one or more processors 404 configured to perform the dynamic rotation of the image 214 and the adaptive calibration for dynamic rotation. In an example, the computing device 210 may include a sensor interpreter 420 configured to process orientation information from the orientation sensors 402 and convert the orientation information into rotational angles corresponding to the computing device 210. For example, the processors 404 may receive the orientation information from the orientation sensors 402 in the form of x, y, z vector coordinates and convert the orientation information into rotational angles (e.g., 0-360 degrees).

In an example, the computing device 210 may also include an angle comparator 422 configured to determine a rotational angle of the computing device 210 is within an angle threshold (or threshold value) of a desired orientation. For example, when rotating the computing device 210 from a first orientation (e.g., landscape orientation) towards a second orientation (e.g., portrait orientation), the angle comparator 422 may receive rotational angle information from the sensor interpreter 420. The angle comparator 422 may compare the rotational angle information with a stored set of orientation angles (e.g., 0 through 90 degrees) corresponding to a rotation of the computing device 210 from the first orientation to the second orientation. The set of orientation angles may include a first endpoint orientation angle (e.g., 0 degrees) and a second endpoint orientation angle (e.g., 90 degrees) corresponding to the first orientation and the second orientation or the bounds of the set of orientation angles. The set of orientation angles may also include intermediate orientation angles (e.g., 1-89 degrees) between the first and second endpoint orientation angles. In this example, since the computing device 210 is rotating towards the second endpoint orientation angle, the angle comparator 422 may compare the rotational angle information with the second endpoint orientation angle to determine when the computing device 210 has rotated within an angle threshold (such as but not limited to 0.1-5 degrees) of the second endpoint orientation angle (e.g., 90 degrees).

In an example, the computing device 210 may also include one or more resting timers 424 configured to determine the computing device 210 is at a resting rotational angle. In an example, once the rotation of the computing device 210 has stopped and the rotational angle of the computing device 210 is within the angle threshold, the resting timer 424 is notified by the angle comparator 422 and the resting timer 424 may initiate a timer clock to determine whether the computing device 210 remains within the angle threshold for a time period (such as but not limited to 3 milliseconds (ms)). If the time period is met, the resting timers 424 may determine the computing device 210 is at a resting rotational angle (e.g., 87 degrees).

In an example, the computing device 210 may also include a mapping coordinator 426 configured to receive information on the resting rotational angle from the resting timer 424 and map the rotational angles of the computing device 210 to a set of image orientation angles, based on the resting rotational angle. In an aspect, the mapping coordinator 426 may set the endpoint orientation angle to the resting rotational angle thereby using the resting rotational angle as an endpoint or a bound for mapping the rotational angles of the computing device 210 to image orientation angles. The mapping coordinator 426 may also map intermediate rotational angles to intermediate image orientation angles. As described in more detail herein, in one implementation, the endpoints of the rotational angles may change due to the rotation of the computing device 210 but the image orientation angles remain between 0 degrees and 90 degrees to correspond to the rotational output of the image 214 in response to rotation of the computing device 201.

Referring to FIG. 5, examples of the rotational angles of the computing device 210 are mapped by the mapping coordinator 426 to the image orientation angles of the image 214 for real-time image rotation in response to computer device rotation.

In a first mapping example 502 performed during a dynamic rotation process, the computing device 210 may physically rotate from a first orientation angle of 0 degrees (e.g., from landscape orientation—orientation 202A) to a second orientation angle of 90 degrees (e.g., to portrait orientation—orientation 202E). In this example, the mapping coordinator 426 may have a one-to-one ratio when mapping the rotational angles (0-90 degrees) to the image orientation angles (0-90 degrees).

In a second mapping example 504 performed during a dynamic rotation process, the computing device 210 may rotate from a first orientation angle of 0 degrees (e.g., from landscape orientation—orientation 202A) towards a second orientation angle of 90 degrees (e.g., to portrait orientation—orientation 202E) but may come to a resting rotational angle at 87 degrees. In this example, the mapping coordinator 426 may have a ratio less than a one-to-one ratio (e.g., 0.97 to 1 ratio) when mapping the rotational angles (0-87 degrees) of the computing device 210 to the image orientation angles (0-90 degrees).

In a third mapping example 506 performed during a dynamic rotation process, the computing device 210 may have a first resting rotational angle of 2 degrees and may rotate towards a second orientation angle of 90 degrees (e.g., to portrait orientation—orientation 202E) but may come to a second resting rotational angle at 87 degrees. In this example, the mapping coordinator 426 may have a ratio less than a one-to-one ratio (e.g., 0.94 to 1 ratio) when mapping the rotational angles (2-87 degrees) of the computing device 210 to the image orientation angles (0-90 degrees). Based on these examples, the mapping coordinator 426 may map the rotational angels of the computing device 210 to the image orientation angles of the image 214 using a linear function. However, in other examples, the mapping function may be non-linear, as described herein.

Referring to FIG. 6, additional examples of the mapping coordinator 426 mapping the rotational angles of the computing device 210 to the image orientation angles of the image 214 relate to a constrained image rotation scenario. In the fourth mapping example 602, fifth mapping example 604, and sixth mapping example 606, the dynamic rotation of the image 214 may be constrained during rotational angles X1-X2 of the computing device 210. For example, as the computing device 210 physically rotates from an initial rotational angle (e.g., 0 or 2 degrees) to the rotational angle X1 and from the rotational angle X2 to an endpoint rotational angle (e.g., 87 or 90 degrees), the image 214 may rotate from a corresponding initial image orientation angle of 0 degrees to image orientation angle Y1 and from image orientation angle Y2 to an endpoint orientation angle of 90 degrees at a first ratio (e.g., 1-to-1) and a second ratio (e.g., 1-to-1) having a slow rising slope. Further, as the computing device 210 physically rotates from the rotational angle X1 to the rotational angle X2, the image 214 may rotate from the image orientation angle Y1 to the image orientation angle Y2 at a third ratio (e.g., 1-to-4) having a fast rising slope.

In an example, the computing device 210 may also include a smoothing interpolator 428 configured to receive image rotational angles from the mapping coordinator 426 and generate incremental rotational angles for the image 214 resulting in a smooth rotation of the image 214 as the computing device 210 is rotated.

In an example, the computing device 210 may also include a graphics processing unit (GPU) 406 configured to receive smoothed interpolation data from the smoothing interpolator 428 and to generate graphics transforms based on the smoothed interpolation data. For example, the GPU 406 may perform one or more of an image rotation, an image offset, or a change in a progression of an image. In performing the image rotation, the GPU 406 may rotate the image 214 in a rotational direction opposite of a rotational direction of the computing device 210 so the image 214 is maintained in the same orientation with respect to the user while the computing device 210 is rotated. The GPU 406 may offset the image 214 in one or more directions of a two dimensional axis such that the image 214 appears to remain in a same location or near the same location throughout the rotation of the computing device 210. The GPU 406 may also change a progression of the image 214 from a current image to a subsequent image or a preceding image in response to the rotation of the computing device 210. For example, if the image 214 corresponds to a video, the rotation of the computing device 210 may cause the video to rewind or fast-forward according to a direction of rotation of the computing device 210.

In an example, the computing device 210 may also include a display 408 configured to receive the image 214 from the GPU 406 and display the image 214.

While FIG. 4 depicts the computing device 210 having components located in a single device, aspects of the present disclosure are not limited to this examples. Instead, in other examples, the orientation and the display 408 (and/or another component) may be located in at a first location while the remaining components are separated from or remote to the first location.

Figure 7:
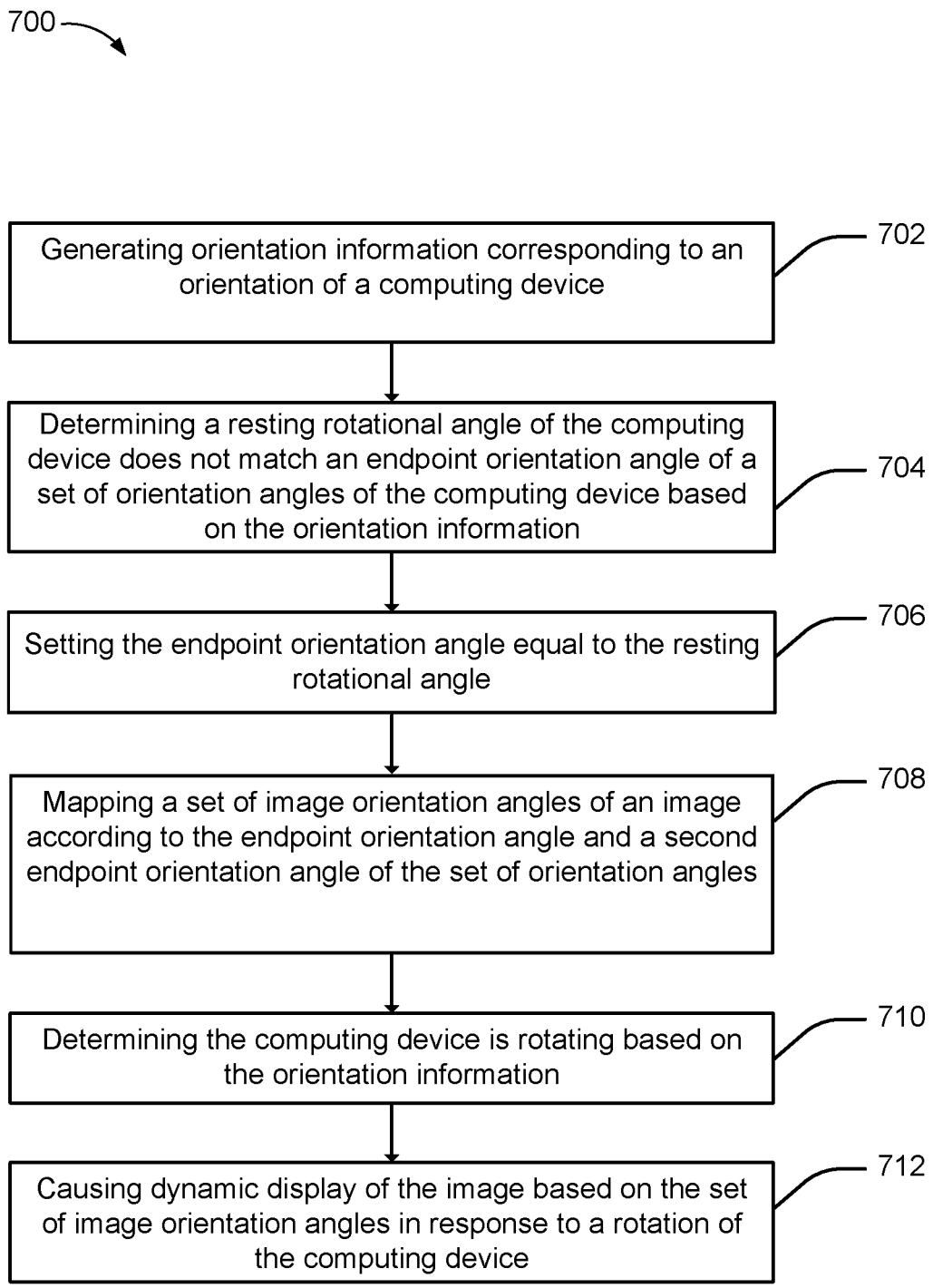
FIG. 7 is a flowchart of an example of a method for adaptive calibration for dynamic rotation, according to aspects of the present disclosure.

Referring to FIG. 7, an example method 700 for adaptive calibration for dynamic rotation of a computing device is depicted. In an example, the method 700 may be performed by the computing device 210 of FIG. 4. Examples of some of the operations of the method 700 may be described in relation to FIGS. 1-6.

At 702, the method 700 may include generating orientation information corresponding to an orientation of a computing device. For example, the orientation sensor 402 of the computing device 210 may generate orientation information corresponding to an orientation of the computing device 210. The orientation information may include one or vector coordinates (e.g., x, y, z coordinates) corresponding to the orientation of the computing device 210. Examples of the orientation sensors 402 may include one or more gravity sensors, accelerometers, gyroscope, and/or any sensor configured to provide a rotational orientation of the computing device 210.

At 704, the method 700 may include determining a resting rotational angle of the computing device does not match an endpoint orientation angle of a set of orientation angles of the computing device based on the orientation information. For example, the processor 404, the angle comparator 422, and/or the angle comparator 422 may determine a resting rotational angle (e.g., 87 degrees) of the computing device 210 does not match an endpoint orientation angle (e.g., 90 degrees) of a set of orientation angles of the computing device 210 based on the orientation information. In an example, the angle comparator 422 may compare rotational angle information with an endpoint orientation angle to determine when the computing device 210 has rotated within an angle threshold (e.g., 0.1-5 degrees) of the endpoint orientation angle (e.g., 90 degrees). Once the rotational angle of the computing device 210 is within the angle threshold, the resting timer 424 may initiate a timer to determine whether the computing device 210 remains within the angle threshold for a time period (e.g., 3 milliseconds (ms)). If the time period is met, the resting timers 424 may determine the computing device 210 is at a resting rotational angle (e.g., 87 degrees).

At 706, the method 700 may include setting the endpoint orientation angle equal to the resting rotational angle. For example, the processor 404 and/or the mapping coordinator 426 may set the endpoint orientation angle equal to the resting rotational angle. In an example, the bounds of the set of orientation angles may change to 0-87 degrees.

At 708, the method 700 may include mapping a set of image orientation angles of an image according to the endpoint orientation angle and a second endpoint orientation angle of the set of orientation angles. For example, the processor 404 and/or the mapping coordinator 426 may map a set of image orientation angles (e.g., 0-90 degrees) of an image according to the endpoint orientation angle and a second endpoint orientation angle of the set of orientation angles (e.g., 0-87 degrees). In an example, the mapping may be based on a linear function or an non-linear function, as described herein.

At 710, the method 700 may include determining the computing device is rotating based on the orientation information. For example, the processor 404 and/or the sensor interpreter 420 may receive may determine the computing device 210 is rotating based on orientation information received from the orientation sensor 402.

At 712, the method 700 may include causing dynamic display of the image based on the set of image orientation angles in response to a rotation of the computing device. For example, the processor 404 and/or the GPU 406 may cause dynamic display of the image 214 based on the set of image orientation angles in response to a rotation of the computing device 210.

Figure 8:
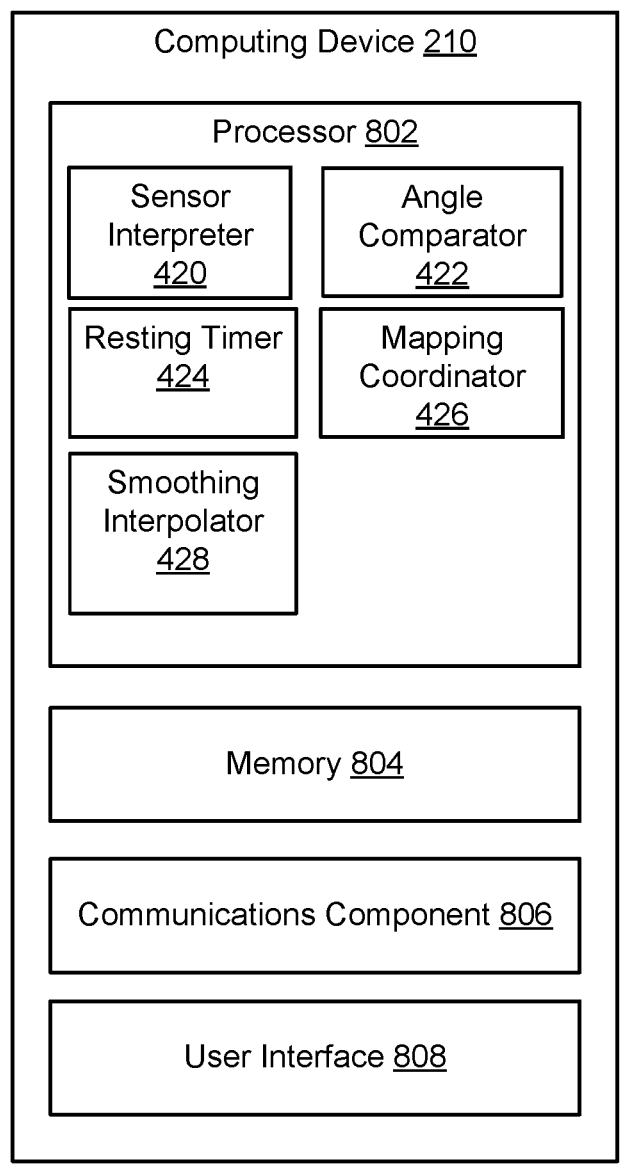
FIG. 8 is a block diagram of additional components of the example computing device of FIG. 4, according to aspects of the present disclosure.

Referring now to FIG. 8, illustrated is an example of other components of the computing device 210 in accordance with an implementation, including additional component details as compared to FIG. 4. In one example, the computing device 210 may include a processor 802 for carrying out processing functions associated with one or more of components and functions described herein. The processor 802 may include a single or multiple set of processors or multi-core processors. Moreover, the processor 802 may be implemented as an integrated processing system and/or a distributed processing system. In an implementation, for example, the processor 802 may include the sensor interpreter 410, the angle comparator 422, the resting timer 424, the mapping coordinator 426, and/or the smoothing interpolator 428.

In an example, the computing device 210 may include memory 804 for storing instructions executable by the processor 802 for carrying out the functions described herein.

Further, the computing device 210 may include a communications component 806 that provides for establishing and maintaining communications with one or more parties utilizing hardware, software, and services as described herein. The communications component 806 may carry communications between components on the computing device 210, as well as between the computing device 210 and external devices and devices located across a communications network and/or devices serially or locally connected to the computing device 210. For example, the communications component 806 may include one or more buses, and may further include transmit chain components and receive chain components associated with a transmitter and receiver, respectively, operable for interfacing with external devices.

Computing device 210 may also include a user interface component 808 operable to receive inputs from a user of the computing device 210 and further operable to generate outputs for presentation to the user. The user interface component 808 may include one or more input devices including but not limited to a keyboard, a number pad, a camera, a mouse, a touch-sensitive display, a digitizer, a navigation key, a function key, a microphone, a voice recognition component, any other mechanism capable of receiving an input from a user, or any combination thereof. Further, the user interface component 808 may include one or more output devices, including but not limited to a display (e.g., display 408), a speaker, a haptic feedback mechanism, a printer, any other mechanism capable of presenting an output to a user, or any combination thereof.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or procedure described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or procedure may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computing device, comprising:
    an orientation sensor to generate orientation information corresponding to an orientation of the computing device;
    a memory storing instructions and a set of orientation angles of the computing device including an endpoint orientation angle and a second endpoint orientation angle; and
    a processor communicatively coupled with the orientation sensor and the memory and configured to execute the instructions to:
        determine a resting rotational angle of the computing device does not match the endpoint orientation angle based on the orientation information;
        recalibrate the endpoint orientation angle to be equal to the resting rotational angle in response to determining the resting rotational angle does not match the endpoint orientation angle;
        map a set of image orientation angles of an image according to the endpoint orientation angle and the second endpoint orientation angle in response to the endpoint orientation angle being recalibrated;
        determine the computing device is rotating based on the orientation information; and
        cause dynamic display of the image based on the set of image orientation angles in response to a rotation of the computing device.

2. The computing device of claim 1, wherein the endpoint orientation angle and the second endpoint orientation angle are initially set at a difference of 90 degrees.

3. The computing device of claim 1, wherein the processor is further configured to execute the instructions to:
    determine whether the computing device is positioned in the resting rotational angle for a time period; and
    compare the resting rotational angle of the computing device with the endpoint orientation angle in response to the computing device being positioned in the resting rotational angle for the time period.

4. The computing device of claim 1, wherein the processor is further configured to execute the instructions to:
    determine whether the resting rotational angle is within a threshold value of the endpoint orientation angle; and
    compare the resting rotational angle of the computing device with the endpoint orientation angle in response to the resting rotational angle being within the threshold value of the endpoint orientation angle.

5. The computing device of claim 4, wherein the processor is further configured to execute the instructions to:
    perform a smoothing interpolation operation on the set of image orientation angles; and
    cause the dynamic display of the image further based on a result of the smoothing interpolation operation.

6. The computing device of claim 1, wherein the processor is further configured to execute the instructions to:
    map the endpoint orientation angle to a first image orientation angle of the set of image orientation angles;
    map the second endpoint orientation angle to a second image orientation angle of the set of image orientation angles; and
    determine intermediate image orientation angles of the set of image orientation angles based on the first image orientation angle and the second image orientation angle.

7. The computing device of claim 1, wherein the processor is further configured to execute the instructions to:
    cause the dynamic display of the image by a graphics transform including one or more of:
        rotating the image in a rotational direction opposite of a rotational direction of the computing device;
        offsetting the image in one or more directions of a two dimensional axis; or
        changing a progression of the image from a current image to a subsequent image or a preceding image in response to the rotation of the computing device.

8. The computing device of claim 1, wherein the orientation information includes one or more vector positions of the computing device, and wherein the processor is further configured to execute the instructions to:
cause the dynamic display of the image as a function of the one or more vector positions of the computing device.

9. The computing device of claim 1, wherein the orientation sensor is a gravity sensor.

10. The computing device of claim 1, wherein the processor is further configured to execute the instructions to:
map the set of image orientation angles further according to a constrained set of orientation angles to limit a number of graphic transforms of the image during at least a portion of the dynamic display of the image in response to the rotation of the computing device.

11. A method, comprising:
generating orientation information corresponding to an orientation of a computing device;
determining a resting rotational angle of the computing device does not match an endpoint orientation angle of a set of orientation angles of the computing device based on the orientation information;
recalibrating the endpoint orientation angle to be equal to the resting rotational angle in response to determining the resting rotational angle does not match the endpoint orientation angle;
mapping a set of image orientation angles of an image according to the endpoint orientation angle and a second endpoint orientation angle of the set of orientation angles in response to the endpoint orientation angle being recalibrated;
determining the computing device is rotating based on the orientation information; and
causing dynamic display of the image based on the set of image orientation angles in response to a rotation of the computing device.

12. The method of claim 11, wherein the endpoint orientation angle and the second endpoint orientation angle are initially set at a difference of 90 degrees.

13. The method of claim 11, further comprising:
determining whether the computing device is positioned in the resting rotational angle for a time period; and
comparing the resting rotational angle of the computing device with the endpoint orientation angle in response to the computing device being positioned in the resting rotational angle for the time period.

14. The method of claim 11, further comprising:
determining whether the resting rotational angle is within a threshold value of the endpoint orientation angle; and
comparing the resting rotational angle of the computing device with the endpoint orientation angle in response to the resting rotational angle being within the threshold value of the endpoint orientation angle.

15. The method of claim 14, further comprising:
performing a smoothing interpolation operation on the set of image orientation angles; and
causing the dynamic display of the image further based on a result of the smoothing interpolation operation.

16. The method of claim 11, further comprising:
mapping the endpoint orientation angle to a first image orientation angle of the set of image orientation angles;
mapping the second endpoint orientation angle to a second image orientation angle of the set of image orientation angles; and
determining intermediate image orientation angles of the set of image orientation angles based on the first image orientation angle and the second image orientation angle.

17. The method of claim 11, further comprising:
wherein the causing the dynamic display of the image by a graphics transform comprises one or more of:
rotating the image in a rotational direction opposite of a rotational direction of the computing device;
offsetting the image in one or more directions of a two dimensional axis; or
changing a progression of the image from a current image to a subsequent image or a preceding image in response to the rotation of the computing device.

18. The method of claim 11, wherein the orientation information includes one or more vector positions of the computing device, and wherein the method further comprises:
causing the dynamic display of the image as a function of the one or more vector positions of the computing device.

19. The method of claim 11, further comprising:
mapping the set of image orientation angles further according to a constrained set of orientation angles to limit a number of graphic transforms of the image during at least a portion of the dynamic display of the image in response to the rotation of the computing device.

20. A non-transitory computer-readable medium storing instructions executable by a processor, comprising:
instructions to generate orientation information corresponding to an orientation of a computing device;
instructions to determine a resting rotational angle of the computing device does not match an endpoint orientation angle of a set of orientation angles of the computing device based on the orientation information;
instructions to recalibrate the endpoint orientation angle to be equal to the resting rotational angle in response to determining the resting rotational angle does not match the endpoint orientation angle;
instructions to map a set of image orientation angles of an image according to the endpoint orientation angle and a second endpoint orientation angle of the set of orientation angles in response to the endpoint orientation angle being recalibrated;
instructions to determine the computing device is rotating based on the orientation information; and
instructions to cause dynamic display of the image based on the set of image orientation angles in response to a rotation of the computing device.

* * * * *